(12) United States Patent
Ganot et al.

(10) Patent No.: US 7,036,885 B2
(45) Date of Patent: May 2, 2006

(54) MOTOR VEHICLE SEAT INCLUDING A SEAT BACK THAT CAN BE TILTED FORWARDS

(75) Inventors: Denis Ganot, Caen (FR); Jean-Christophe Bouteloup, Saint Clair de Halouze (FR)

(73) Assignee: Faurecia Sieges d'Automobile, Nanterre (FR)

( * ) Notice: Subject to any disclaimer, the term of this patent is extended or adjusted under 35 U.S.C. 154(b) by 17 days.

(21) Appl. No.: 10/774,735

(22) Filed: Feb. 9, 2004

(65) Prior Publication Data

US 2005/0104433 A1    May 19, 2005

(30) Foreign Application Priority Data

Feb. 12, 2003    (FR) .................................. 03 01665

(51) Int. Cl.
*B60N 2/20*    (2006.01)
(52) U.S. Cl. .............. 297/378.12; 297/341; 297/344.11
(58) Field of Classification Search ........... 297/378.12, 297/341, 344.11
See application file for complete search history.

(56) References Cited

U.S. PATENT DOCUMENTS

| | | | |
|---|---|---|---|
| 4,394,048 A * | 7/1983 | Sakurai et al. ............... 297/367 |
| 4,666,208 A * | 5/1987 | Tatematsu et al. ........... 297/341 |
| 5,626,392 A | 5/1997 | Bauer et al. ............ 297/378.12 |
| 5,695,247 A * | 12/1997 | Premji ........................ 297/341 |
| 6,139,104 A | 10/2000 | Brewer ............... 297/378.12 X |
| 6,238,002 B1 | 5/2001 | Brewer et al. ...... 297/378.12 X |
| 6,336,679 B1 | 1/2002 | Smuk ..................... 297/378.12 |
| 6,736,461 B1 * | 5/2004 | Blair et al. ............. 297/378.12 |
| 6,739,668 B1 * | 5/2004 | Coman et al. ......... 297/378.12 |
| 6,827,404 B1 * | 12/2004 | Blair et al. ............. 297/378.12 |
| 6,860,562 B1 * | 3/2005 | Bonk ..................... 297/378.12 |
| 2004/0051361 A1 * | 3/2004 | Rausch et al. ............... 297/341 |
| 2004/0061371 A1 * | 4/2004 | Tame ..................... 297/378.12 |
| 2004/0075324 A1 * | 4/2004 | Rausch et al. ............... 297/341 |
| 2004/0124684 A1 * | 7/2004 | Bonk ..................... 297/378.12 |
| 2004/0262969 A1 * | 12/2004 | Sasaki et al. ........... 297/344.11 |
| 2005/0029851 A1 * | 2/2005 | Yamada ..................... 297/341 |

FOREIGN PATENT DOCUMENTS

| | | |
|---|---|---|
| DE | 195 10 618 | 11/1995 |
| EP | 0 410 814 | 1/1991 |
| FR | 2 800 021 | 4/2001 |
| GB | 640077 | 8/1950 |

OTHER PUBLICATIONS

FR 0301665 International Search Report dated Oct. 8, 2003.

* cited by examiner

*Primary Examiner*—Rodney B. White
(74) *Attorney, Agent, or Firm*—McCracken & Frank LLP (57) ABSTRACT

A motor vehicle seat including a transmission device which connects a seat back to a locking device of a runner for the purpose of moving the locking device into an actuating position. The transmission device comprises at least one cable, a spring and a drive mechanism for driving the spring over a first stroke enabling the locking device of the runner to be unlocked, the drive mechanism continuing on its own over a second stroke to enable the seat back to be tilted forwards.

11 Claims, 6 Drawing Sheets

MOTOR VEHICLE SEAT INCLUDING A SEAT BACK THAT CAN BE TILTED FORWARDS

The present invention relates to motor vehicle seats that comprise a sliding seat proper and a seat back that can be tilted forwards.

FIELD OF THE INVENTION

More particularly, the invention relates to seats that are used as front seats in vehicles having two side doors. In such vehicles, access to the rear seats of the vehicle requires the seat back to be tilted forwards in order to enable the seat proper of the seat to be slid freely to a front abutment position in order to clear an unobstructed space that is as large as possible between the rear edge of the front seat and the side edges of the body of the vehicle that co-operate with the doors to close the passenger compartment of the vehicle.

Such a seat generally comprises:
- at least one runner comprising a fixed rail, a moving rail, and a locking device mounted to move between a rest position in which the locking device normally prevents the moving rail from moving relative to the fixed rail, and an actuating position in which said locking device enables the moving rail to move relative to the fixed rail;
- a seat proper connected to the moving rail of the runner;
- a seat back mounted to pivot relative to the seat proper about a transverse pivot axis between an upstanding in-use position and a tilted-forwards position; and
- a transmission device which connects the seat back to the locking device of the runner for moving the locking device into its actuating position when the seat back is placed in its tilted-forwards position.

BACKGROUND OF THE INVENTION

The transmission device must make it possible to take up the manufacturing tolerances of the seat back, of the seat proper, and of the locking device of the runner that connects the seat proper to the floor of the vehicle.

Such a transmission device is known, in particular, from French Patent Application FR 2 800 021. That transmission device comprises, in particular, a spring that has a first end connected to the locking device of the runner and a second end connected to a sleeve which is itself secured to a cable connected to the back of the seat. However, with that type of transmission device, the traction spring is designed to be stretched throughout the pivoting of the seat back so as to absorb the stroke or pivoting of the seat back after the locking device of the runner has been unlocked. That known transmission device thus requires a relatively large space to be provided in order to enable the spring to stretch throughout the pivoting of the seat back, in spite of small amount of internal space available in vehicle seats.

OBJECTS AND SUMMARY OF THE INVENTION

An object of the present invention is to mitigate those drawbacks by providing a transmission device that can take up the manufacturing clearance while also being compact.

To this end, in the invention, in a seat of the type in question, the transmission device comprises firstly at least one cable that extends between a first end mounted on the locking device and a second end connected to a spring, and secondly a drive mechanism connected mechanically to the seat back so as to be moved when the seat back moves between its upstanding in-use position and its tilted-forwards position;

and the spring connected to the cable is designed to co-operate with an abutment element of the drive mechanism so that, while the seat back is being brought from its upstanding position to its tilted-forwards position, said abutment element can move firstly over a first stroke during which the spring is in contact with said abutment element so as to enable the locking device to move towards its actuating position under the effect of the traction from the pre-tensioned spring, and then over a second stroke during which the abutment element continues over its stroke on its own, without being in contact with the spring so as to enable the seat back to be tilted to its tilted-forwards position, the spring holding the locking device in its actuating position.

In preferred embodiments of the invention, it is optionally possible to use one or more of the following provisions:
- the seat has two runners, each of which is provided with a locking device, and the transmission device comprises two cables mounted on respective ones of the two locking devices of the two runners, and two springs connected to respective ones of the two cables, the two springs serving to co-operate with respective ones of the two abutment elements of the same drive mechanism;
- the drive mechanism is mounted to pivot on a pivot pin fixed to the seat proper;
- the drive mechanism is constrained to pivot with a pivot pin mounted to pivot on the seat proper;
- the drive mechanism is connected mechanically to the seat back in order to enable the two abutment elements to pivot angularly over the first and second strokes, and the two springs are formed by spiral springs, each of which has a first end connected to the cable which is associated with it, and a second end fixed to said pivot pin;
- the drive mechanism is in the form of a plate which has two opposite faces on which respective ones of the two abutment elements are provided, and the two springs are disposed against respective ones of the two opposite faces of said plate;
- the seat proper includes a rigid seat proper structure having first and second longitudinal cheek plates mounted in fixed manner on respective ones of the two runners, and the pivot pin of the drive mechanism is mounted on the first longitudinal cheek plate; and
- the first and second longitudinal cheek plates are interconnected via a rear cross-member, and the cable which connects the drive mechanism to the second cheek plate has a transverse portion which extends parallel to and in the immediate vicinity of the cross-member of the seat proper structure.

In addition, the invention also provides a transmission device for a vehicle seat as defined above, said transmission device comprising:
- a drive mechanism in the form of a plate on which a pivot pin is mounted, said plate having two opposite faces on which respective ones of two abutment elements are mounted; and
- two spiral springs, each of which has a first end serving to come into contact with the abutment element that is associated with it, and a second end fixed to said pivot pin.

According to another characteristic of the transmission device, the drive mechanism is mounted to pivot on the pivot pin.

According to yet another characteristic of the transmission device, the drive mechanism is constrained to rotate with the pivot pin.

BRIEF DESCRIPTION OF THE DRAWINGS

Other characteristics and advantages of the invention appear from the following description of two embodiments thereof, given by way of non-limiting example and with reference to the accompanying drawings, in which:

FIGS. 4a to 6a are diagrammatic views of a portion of the transmission device of the seat in a first embodiment of the invention, respectively when the seat back is in a normal in-use position, in an intermediate tilted-forwards position causing the runners of the seat to be unlocked, and in a rear seat access position;

FIGS. 4b to 6b show diagrammatic views of a portion of the transmission device of the seat in a second embodiment of the invention, respectively when the seat back is in a normal in-use position, in an intermediate tilted-forwards position causing the runners of the seat to be unlocked, and a rear seat access position.

MORE DETAILED DESCRIPTION

In the various figures, like references designate elements that are identical or similar.

Figure 1:
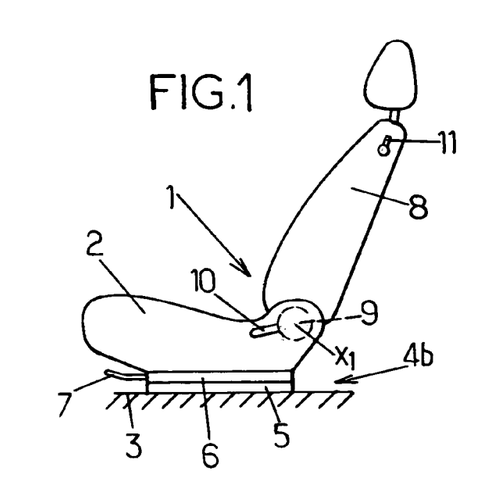
FIG. 1 is a side view of an embodiment of a seat of the invention in the normal in-use position.

FIG. 1 shows a motor vehicle seat 1, in particular a front seat for a vehicle having two side doors.

The seat 1 includes a seat proper 2 which is mounted to slide on a vehicle floor 3 (or on some other portion of the body of the vehicle) by means of two longitudinal and parallel runners 4a, 4b, only the runner 4b being visible in FIG. 1.

Each of said runners 4a, 4b comprises a fixed rail 5 mounted in fixed manner on the floor 3 of the vehicle, and a moving rail 6 mounted to slide along the fixed rail 5. Each runner further comprises a locking device having a latch (not shown in FIG. 1) internal to the runner that is associated with it and which is interposed between the fixed rail 5 and the moving rail 6.

Each internal latch is designed to co-operate with a control bar 7 that can be actuated by the user to go into an unlocking position in which the internal latch of each runner allows the moving rail 6 to move relative to the fixed rail 5. Each internal latch or the control bar 7 can be urged resiliently into a rest position in which the internal latch prevents the corresponding moving rail 6 from being moved longitudinally.

The control bar 7 conventionally has an arcuate shape (see FIG. 4) with a central portion accessible to the user of the seat under the front portion of the seat, and two side branches 7a, 7b that act simultaneously on the internal latches of both of the runners.

In addition, the seat also includes a seat back 8 mounted to pivot on the seat proper 2 about a transverse horizontal axis X1 so that a user can adjust the inclination of the seat back 8 backwards or forwards.

Figure 3:
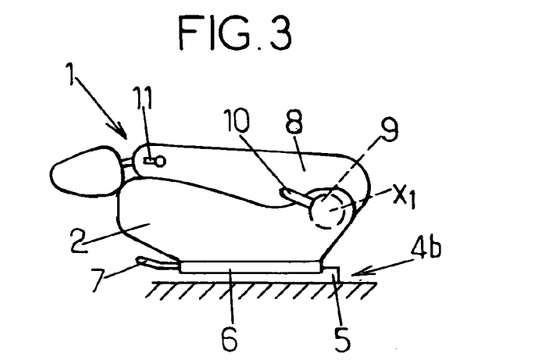

The inclination of the seat back is adjusted in this way by means of a hinge 9 that is known per se, and that can be actuated via a handle 10 from the seat proper 2 of the seat in order to make it possible to adjust the seat back in the upstanding in-use position as shown in FIG. 1. The handle 10 also makes it possible, once it has been actuated, to bring the seat back 8 into a folded-down position in which it is folded down to form a table-top, as shown in FIG. 3.

When a user wishes to access the space situated behind the seat 1, in particular in order to sit down on the rear bench seat of the vehicle or in order to leave said rear bench seat, it is necessary to cause the seat back 8 of the seat to pivot forwards about the pivot axis X1, e.g. by actuating a control lever 11 mounted on one of the side portions of the seat back 2 or on the rear face of the seat back.

Figure 2:
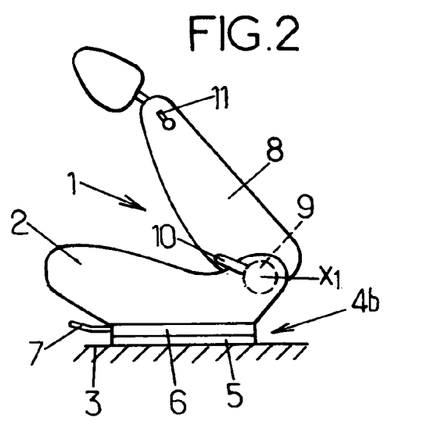
FIGS. 2 and 3 are views similar to FIG. 1, respectively showing the seat back of the seat in an intermediate tilted-forwards position for giving access in particular to the rear seats of the vehicle, and in a position in which it is folded down to form a table top.

As explained below, the control lever 11 being actuated releases the seat back 8, which can pivot forwards into its intermediate tilted-forwards position shown in FIG. 2, in which the seat back forms an angle lying in the range 30° to 60° relative to the vertical. When the seat back reaches said intermediate tilted-forwards position by means of the control lever 11 being actuated, the seat back 2 then causes the locking system of each runner 4a, 4b to be unlocked as described below with reference to FIGS. 4 to 6.

The seat proper 2 includes a rigid seat proper structure formed by a first side cheek plate 21 and by a second side cheek plate 22 interconnected by a horizontal and transverse cross-member 23. Similarly, the seat back includes a first side upright 81 connected to the first side cheek plate 21 of the seat proper 2 by means of the hinge 9, and a second side upright 82 mounted to pivot relative to the second side cheek plate 22, e.g. by means of a second hinge connected to the hinge 9 by means of a coupling bar 91.

Figure 4:
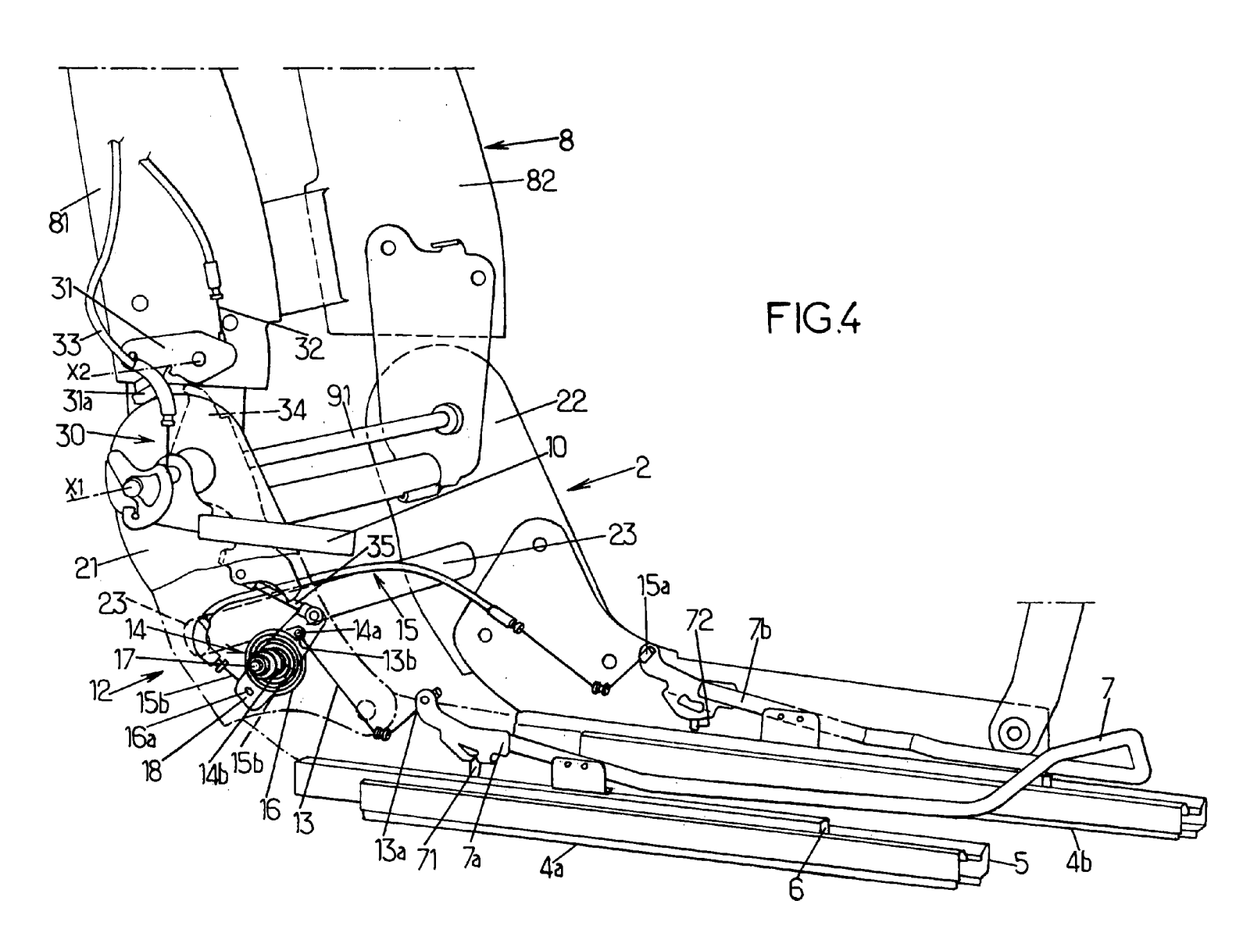
FIG. 4 is a fragmentary perspective view of a portion of the framework of the seat of FIGS. 1 to 3, in the normal in-use position.

As can been seen in FIG. 4, the seat 1 of the vehicle includes a transmission device 12 which connects the seat back 8 to the locking device of each runner 4a, 4b, namely the control bar 7 and each internal latch disposed in the runners 4a, 4b.

In the example considered herein, the transmission device 12 comprises:
  a first cable 13 which extends between firstly a first end 13a connected to the locking device of the first runner 4a, the side branch 7a of the control bar 7 being provided with a projecting element 71 serving to actuate the internal latch of the runner 4a, and secondly a second end 13b connected to a first spring 14; and
  a second cable 15 which extends between firstly a first end 15a connected to the locking device of the second runner 4b, the side branch 7b of the control bar 7 being provided with a projecting element 72 serving to actuate the internal latch of said runner 4b, and secondly a second end 15b connected to a second spring 16.

The ends 13b, 15b of the first and second cables 13 and 15 are connected to respective ones of the ends 14a and 16a of the two springs 14 and 16.

The two springs 14 and 16 are formed by spiral springs which have respective second ends 14b, 16b, both of which are connected to a pivot pin 17a mounted on the seat proper.

Figures 4A, 5A, 6A:
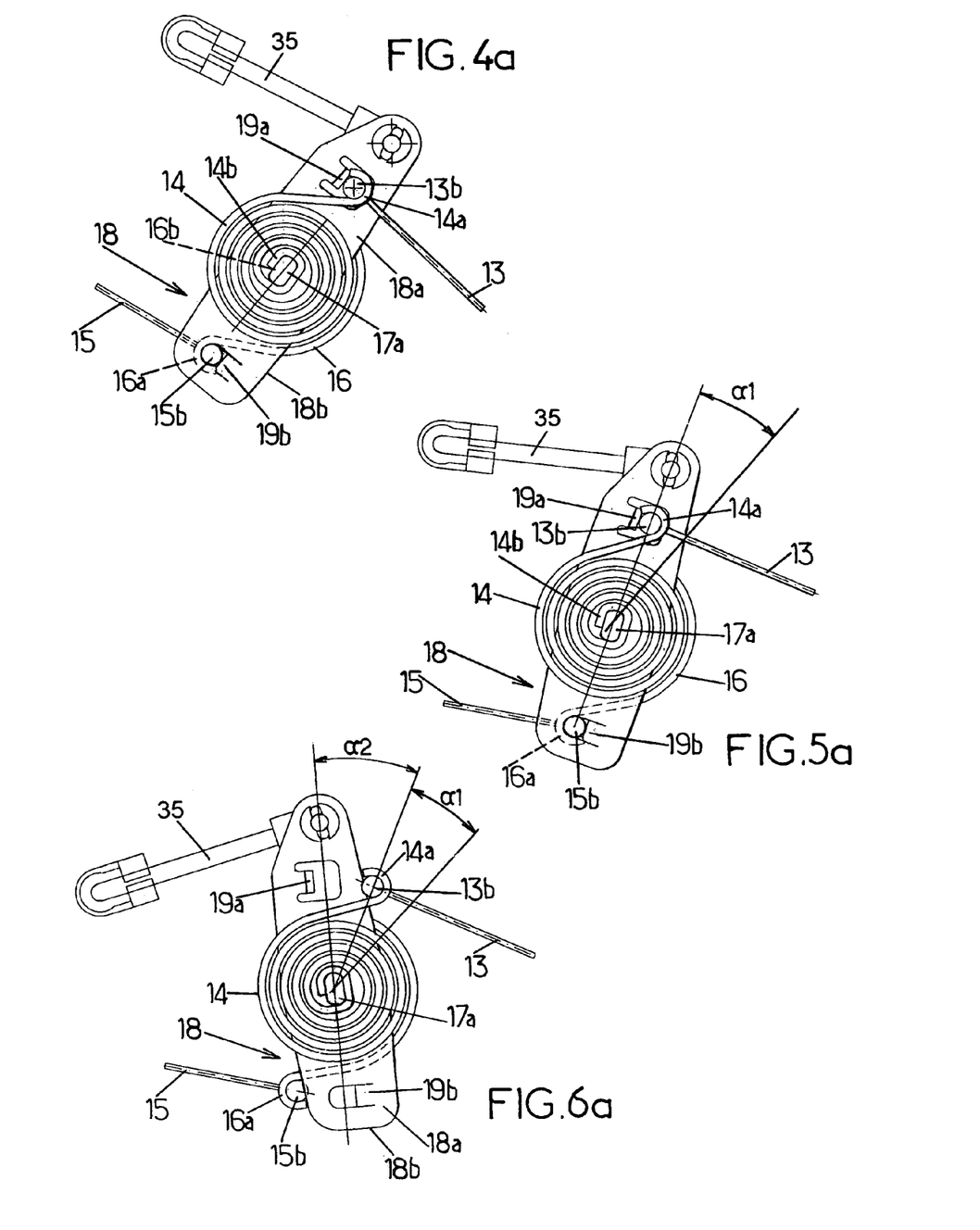
Figure 5:
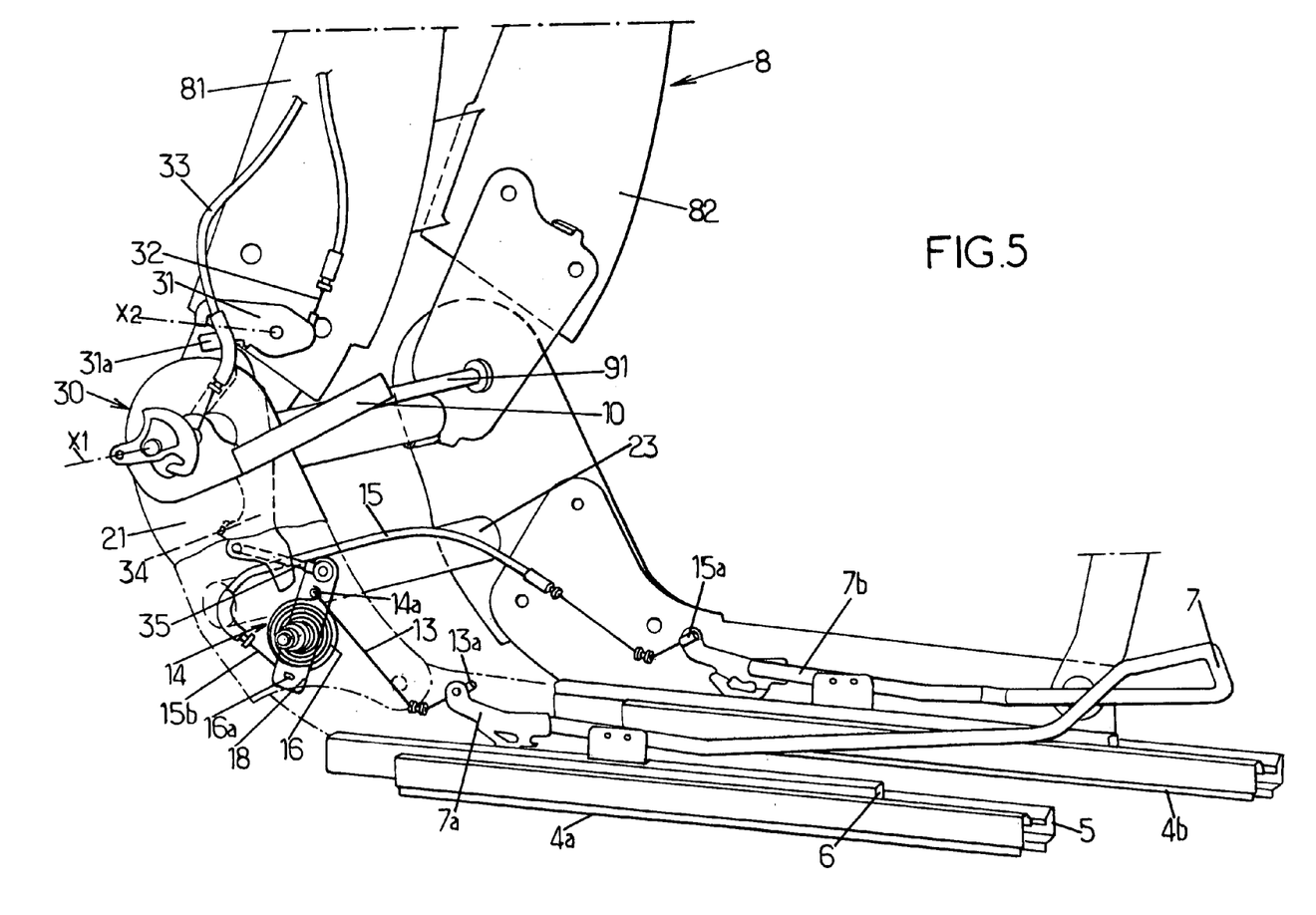
FIG. 5 is a fragmentary perspective view similar to FIG. 4, the seat back of the seat being in the intermediate tilted-forwards position causing the runners to be unlocked.
Figure 6:
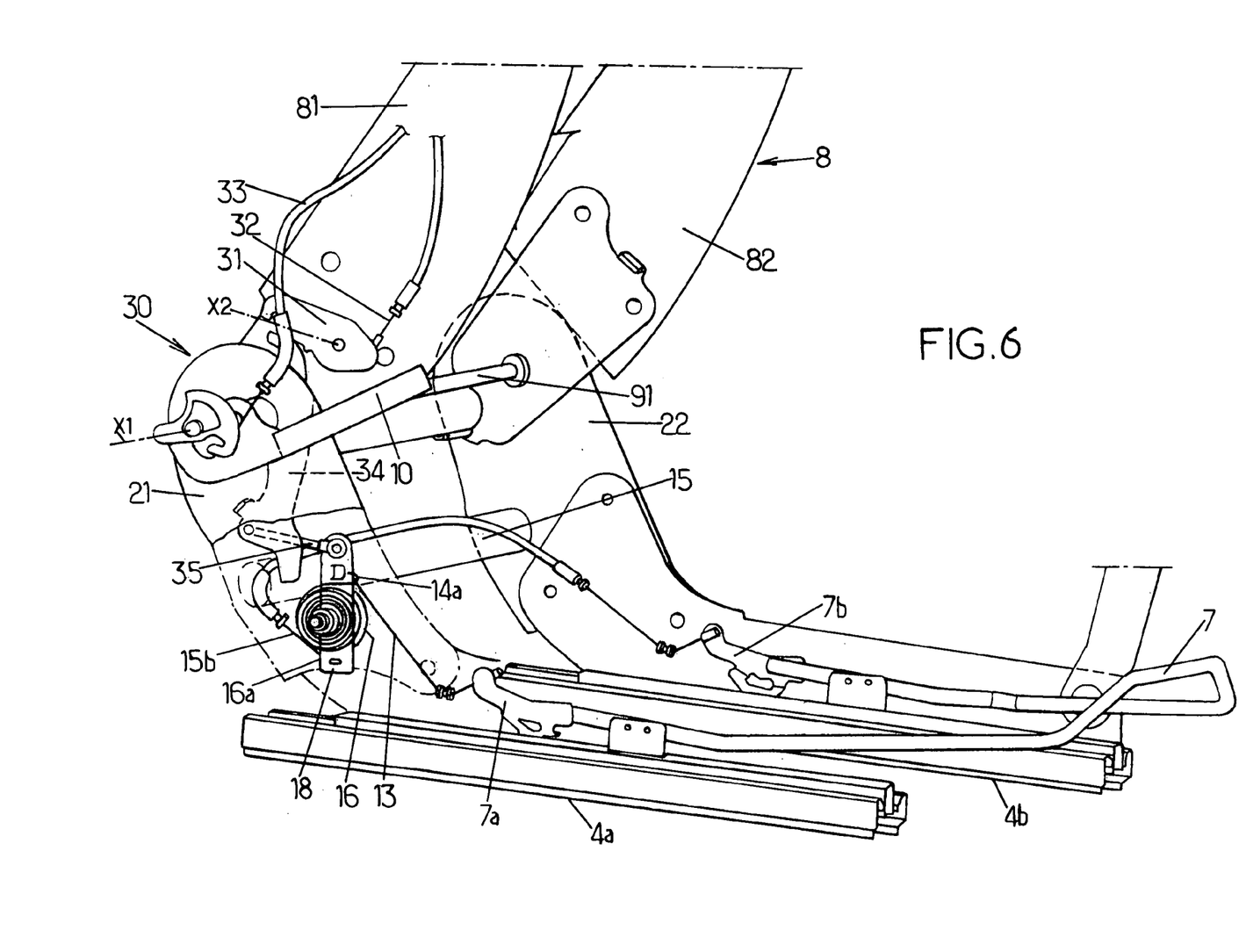
FIG. 6 is a view similar to FIG. 5 showing the seat back of the seat in a rear seat access position when the runners of the seat are unlocked.

FIGS. 4a to 6a show detailed views of a first embodiment of the transmission device 12 when the seat back is in respective ones of the positions shown in FIGS. 4 to 6. The transmission device 12 further comprises a drive mechanism 18 which is in the form of a plate fixed to the pivot pin 17a which is mounted to pivot on the first cheek plate 21 of the seat proper structure. The plate 18 has two opposite faces 18a, 18b on which the two spiral springs 14 and 16 are respectively disposed.

Each of the faces 18a, 18b of the plate of the drive mechanism 18 also has an abutment element 19a, 19b made, for example, by stamping and folding the plate 18. Said two abutment elements 19a, 19b of the plate 18 are designed to co-operate with respective ones of the ends 14a and 16a of the two spiral springs 14, 16 when the seat back 8 is moved from its upstanding in-use position.

In this first embodiment, the plate 18 is fixed to the pivot pin 17a and the spiral springs 14 and 16 are mounted as pre-stressed so that the ends 14a and 16a of said springs come into abutting contact against respective ones of the abutment elements 19a and 19b of the plate 18. Thus, the transmission device, comprising the plate 18, the pivot pin 17a and the springs 14 and 16, forms a module that can be mounted directly on the seat proper by means of the pivot axis 17a being pivotally coupled to the side cheek plate 21 of the seat proper 2.

In addition, the transmission device 12 further comprises a coupling mechanism 30 connecting the seat back 8 to the drive mechanism or plate 18 so as to cause the drive mechanism 18 to move when the seat back 8 moves between its upstanding in-use position and its rear seat access position after the control lever 11 of the seat back 8 has been actuated.

For example, the coupling mechanism 30 can comprise a first lever 31 mounted to pivot about the transverse and horizontal and transverse axis X2 of a pin mounted on the first side upright 81 of the seat back 8, said first lever 31 being connected to a cable 32 that can be actuated by the control lever 11 so as to cause said first lever 31 to pivot about the axis X2. A cable 33 also connects the control lever to an unlocking mechanism of the hinge 9 so as to unlock said hinge 9 when the control lever 11 is actuated. The coupling mechanism 30 further comprises a second lever 34 mounted to pivot freely about the coupling bar 91 that interconnects the two side uprights 81, 82. The second lever 34 is also connected via a pivot coupling to a control rod 35 mounted to pivot on the drive mechanism or plate 18.

Thus, when the control lever 11 of the seat back 8 is actuated, the tensioned cable 32 causes the first lever 31 to pivot about the axis X2 so that an abutment surface 31a of the first lever 31 is disposed facing the second lever 34. The abutment surface 31a of the first lever 31 comes into abutting contact with the second lever 34 after the seat back and thus the lever 31 have traveled over a predetermined angular stroke, so that the second lever 34 causes the plate 18 and the pivot pin 17 to pivot by means of the control rod 35.

As can be seen in FIGS. 4 and 4a, when the seat back is in the upstanding in-use position, the ends 14a, 16a of the two spiral springs 14, 16 are in abutment against respective ones of the abutment elements 19a, 19b of the plate 18. In this configuration (shown in FIGS. 4 and 4a), the two abutment elements 19a, 19b of the plate 18 hold the two ends 14a, 16a of the two springs 14 and 16 in the blocked position so that the two spiral springs 14, 16 do not act, via the cables 13 and 15, on the locking devices of the two runners 4a and 4b.

When the seat back is brought from its upstanding in-use position to a tilted-forwards position as shown in FIGS. 5 and 5a, by actuating the control lever 11, the coupling mechanism 30 causes the plate 18 and the pivot pin 17a to pivot so that the two abutment elements 19a and 19b of the plate 18 travel over an angular stroke α1. During this angular stroke α1, the two ends 14a, 16a of the two spiral springs 14, 16 that are pre-stressed remain in abutting contact with the two abutment elements 19a, 19b while thus traveling over the angular stroke α1. During this angular stroke α1, and as can be seen in FIGS. 5 and 5a, the two spiral springs 14, 16 then independently actuate the side branches 7a, 7b of the control bar 7, by means of the cables 13 and 15 so that the elements 71 and 72 bring the internal latches of each runner 4a and 4b from their rest positions to their actuating positions in which each moving rail can move relative to the fixed rail that is associated with it.

When the user continues to tilt the seat back 8 forwards to bring it to its rear seat access position, as can be seen in FIGS. 6 and 6a, the coupling mechanism 30 continues to pivot the plate 18 and the pivot axis 17a over an angular stroke α2 during which the two abutment elements 19a, 19b of the plate 18 are no longer in contact with the ends 14a, 16a of the springs 14 and 16. The ends 14a, 16a of the two spiral springs 14, 16 nevertheless hold the locking devices of the runners 4a, 4b in the actuating positions, thereby making it possible for each moving rail 6 to move longitudinally relative to its fixed rail 5.

The seat also includes abutment means against which the second lever 34, for example, is designed to come into abutting contact when the seat back 8 is in the rear seat access position at the end of the angular stroke α2, thereby blocking the seat back 8 in this position.

The coupling mechanism 30 further comprises resilient drive means such as a spiral spring interposed between the coupling bar 91 and the second lever 34 so as to bring said second lever into its initial position (as shown in FIG. 4) when the seat back 8 is returned towards an upstanding in-use position. Thus, when the user wishes to bring the seat back 8 from the rear seat access position towards an upstanding in-use position, the coupling mechanism 30 causes the plate 18 to pivot in an opposite pivot direction so that the abutment elements 19a, 19b of the plate 18 come back into abutment contact with the ends 14a, 16a of the two spiral springs 14, 16 so as to relax and so as to move each of the ends 14a, 16a of each spring 14, 16 so as to enable the locking devices of the runners to be re-locked.

The transmission mechanism 12 thus makes it possible to move the seat back to a rear seat access position in which the abutment elements 19a, 19b of the plate 18 no longer co-operate with the springs 14, 16 which then remain in a position as shown in FIG. 6a so as to ensure that each locking device is held in an actuating position and while limiting considerably the space occupied by the springs while the seat back is being put into the rear seat access position. In addition, if, for example, an object is blocking the control bar 7 so that it is prevented from pivoting, the seat back 8 can still be tilted forwards by means of the coupling mechanism 30 which then pivots only the drive plate 18, the pivot pin 17a and the ends 14b, 16b of the two springs 14, 16, the ends 14a and 16a of said springs 14 and 16 then remaining stationary under the effect of the control bar 7 being blocked.

In addition, as can be seen in FIG. 4, 5, or 6, the second cable 15 is substantially U-shaped with two side branches mounted on respective ones of the two longitudinal cheek plates 21, 22 of the seat proper structure, and one middle and transverse branch disposed parallel to and substantially in the vicinity of the horizontal cross-member 23 interconnecting the two longitudinal cheek plates 21, 22. Thus, the second cable 15 being disposed in this way makes it possible for a user to stow objects between the two longitudinal cheek plates 21, 22, without impeding proper operation of the unlocking of the two runners 4a, 4b when the control member 11 carried by the seat back 8 is actuated.

Figure 4B:
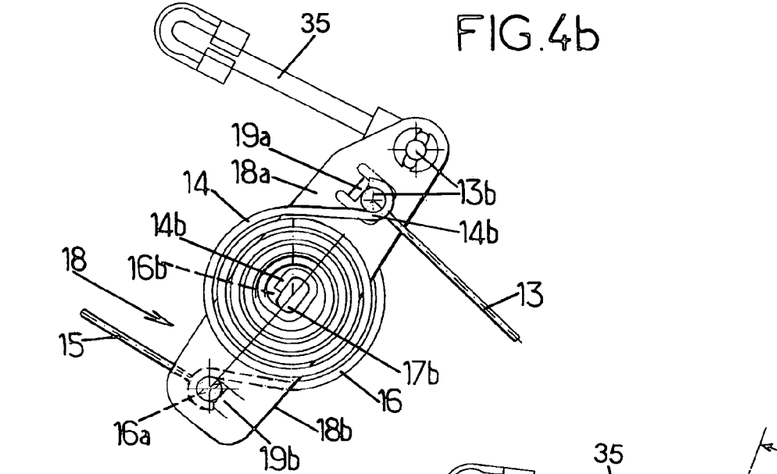
Figure 5B:
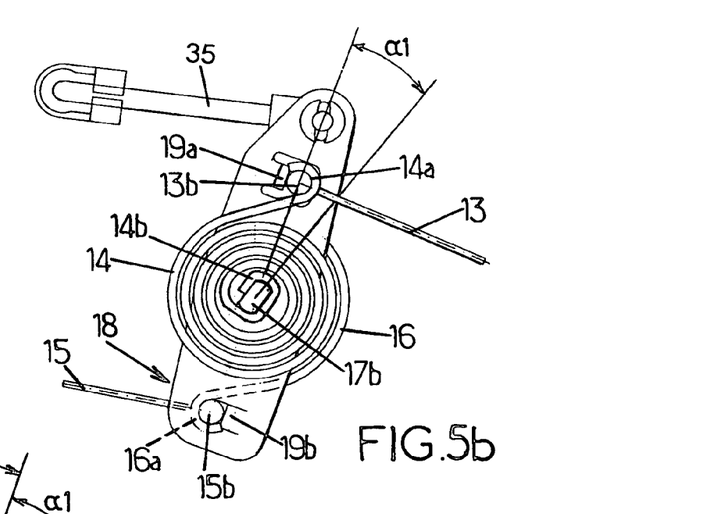
Figure 6B:
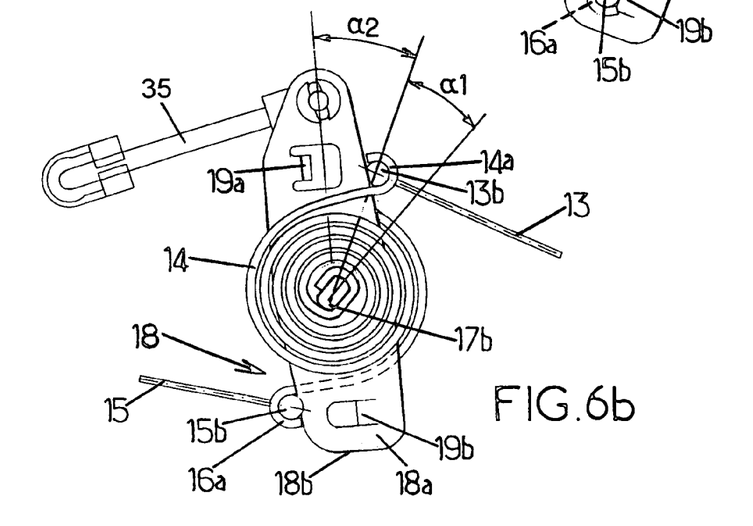

FIGS. 4b, 5b, and 6b show detailed views of the transmission device 12 in a second embodiment and when the seat back is in respective ones of the positions shown in FIGS. 4 to 6.

In this second embodiment, the transmission device 12 also comprises a drive mechanism 18 which is in the form of a plate. However, said plate 18 is mounted to pivot about a pivot pin 17b that is fixed directly to the first cheek plate 21 of the seat proper structure.

As can be seen in FIGS. 4 and 4b, when the seat back is in the upstanding in-use position, the ends 14a, 16a of the two spiral springs 14, 16 are in abutment against respective ones of the abutment elements 19a, 19b of the plate 18. In this configuration, each of the two abutment elements 19a, 19b of the plate 18 exerts a force on a respective one of the ends 14a, 16a of the two spiral springs 14, 16 so as to tension them so that they can, in turn, exert a force at least equal to the force necessary to actuate the internal latch of each runner 4a, 4b by means of the branches 7a, 7b of the control bar 7.

When the seat back 8 is brought from its upstanding in-use position to a tilted-forwards position, as shown in FIGS. 5 and 5b, by actuating the control lever 11, the same coupling mechanism 30 causes the plate 18 to pivot about the pivot pin 17b so that the two abutment elements 19a and 19b of the plate 18 travel over an angular stroke α1. During this angular stroke α1, the two ends 14a, 16a of the two pre-stressed spiral springs 14, 16 remain in abutting contact with the two abutment elements 19a, 19b, while thereby traveling over the angular stroke α1. During this angular stroke α1, and as can be seen in FIGS. 5 and 5b, the two spiral springs 14, 16 then actuate, independently from each other, the side branches 7a, 7b of the control bar 7, by means of cables 13 and 15 so as to unlock the runners 4 and 4b.

When the user continues to tilt the seat back 8 forwards in order to bring it towards its rear seat access position, as can be seen in FIGS. 6 and 6b, the coupling mechanism 30 continues to cause the plate 18 to pivot about the pivot pin 17b over a second angular stroke α2, during which the two abutment elements 19a, 19b of the plate 18 are no longer in contact with the ends 14a, 16a of the two springs 14 and 16. However, the two ends 14a, 16a of the two spiral springs 14, 16 hold the locking devices of the runners 4a, 4b in the actuating position, thereby enabling each moving rail 6 to move longitudinally relative to its fixed rail 5.

Conversely, when the user wishes to return the seat back 8 from the rear seat access position to an upstanding in-use position, the coupling mechanism 30 causes the plate 18 to pivot about the pivot pin 17b so that the abutment elements 19a, 19b of the plate 18 come back into abutting contact with the ends 14a, 16a of the spiral springs 14, 16 so as to re-tension them up to a force not less than the force necessary to actuate the locking devices of the runners 4a, 4b as shown in FIG. 4b.

The transmission mechanism of the second embodiment thus makes it possible to move the seat back 8 to a rear seat access position in which the abutment elements 19a, 19b of the plate 18 no longer co-operate with the springs 14, 16 while the ends 14b, 16b of said springs are fixed to the pivot pin 17b which is itself fixed relative to the seat proper 2. Thus, while the seat back 8 is being brought to its rear seat access position, the springs 14, 16 never undergo any stretching.

What is claimed is:

1. A motor vehicle seat comprising:
at least one runner comprising a fixed rail, a moving rail, and a locking device mounted to move between a rest position in which the locking device normally prevents the moving rail from moving relative to the fixed rail, and an actuating position in which said locking device enables the moving rail to move relative to the fixed rail;
a seat proper connected to the moving rail of the runner;
a seat back mounted to pivot relative to the seat proper about a transverse pivot axis between an upstanding in-use position and a tilted-forwards position; and
a transmission device which connects the seat back to the locking device of the runner for moving the locking device into its actuating position when the seat back is placed in its tilted-forwards position;
wherein the transmission device comprises:
at least one cable that extends between a first end mounted on the locking device and a second end;
a drive mechanism connected mechanically to the seat back so as to be moved when the seat back moves between the upstanding in-use position and the tilted-forwards position, said drive mechanism including at least an abutment element;
at least a spring connected to the second end of the cable independently of the seat back, said spring being adapted to displace said cable with said locking device up to the actuating position of the locking device, said spring cooperating with said abutment element of the drive mechanism to prestress said spring and maintain said spring and said cable in a first position corresponding to the rest position of the locking device while the seat back is in the upstanding position, so that, while the seat back is being brought from the upstanding position to the tilted-forwards position, said abutment element moves firstly over a first stroke during which the spring is in contact with said abutment element and the locking device is moved towards the actuating position under the effect of the traction from the spring, and then over a second stroke during which the abutment element continues to move on its own, without being in contact with the spring so as to enable the seat back to be tilted to the tilted-forwards position, the spring then holding the locking device in the actuating position.

2. A seat according to claim 1, having two runners, each of which is provided with a locking device, and the transmission device comprises two cables respectively mounted on the two locking devices of the two runners, and two springs respectively connected to the two cables, the two springs serving to co-operate with the two abutment elements respectively of the same drive mechanism.

3. A seat according to claim 2, in which the drive mechanism is mounted to pivot on a pivot pin fixed to the seat proper.

4. A seat according to claim 3, in which the drive mechanism is connected mechanically to the seat back in order to enable the two abutment elements to pivot angularly over the first and second strokes, and the two springs are formed by spiral springs, each of which has a first end connected to the cable which is associated with it, and a second end fixed to said pivot pin.

5. A seat according to claim 4, in which the drive mechanism is in the form of a plate which has two opposite faces on which of the two abutment elements are provided respectively, and the two springs are disposed against the two opposite faces respectively of said plate.

6. A seat according to claim 5, in which the seat proper includes a rigid seat proper structure having first and second longitudinal cheek plates mounted in fixed manner on the two runners respectively, and the pivot pin of the drive mechanism is mounted on the first longitudinal cheek plate.

7. A seat according to claim 6, in which the first and second longitudinal cheek plates are interconnected via a rear cross-member, and the cable which connects the drive mechanism to the second cheek plate has a transverse portion which extends parallel to and in the immediate vicinity of the cross-member of the seat proper structure.

8. A seat according to claim 2, in which the drive mechanism is constrained to pivot with a pivot pin mounted to pivot on the seat proper.

9. A transmission device for a vehicle seat according to claim 1, said transmission device comprising:

a drive mechanism in the form of a plate on which a pivot pin is mounted, said plate having two opposite faces on which two abutment elements are mounted respectively; and two spiral springs, each of which has a first end serving to come into contact with the abutment element that is associated with it, and a second end fixed to said pivot pin.

10. A transmission device according to claim 9, in which the drive mechanism is mounted to pivot on the pivot pin.

11. A transmission device according to claim 9, in which the drive mechanism is constrained to rotate with the pivot pin.

* * * * *